(12) United States Patent
Hatano et al.

(10) Patent No.: US 7,693,792 B2
(45) Date of Patent: Apr. 6, 2010

(54) PAYMENT SYSTEM AND METHOD, SERVER APPARATUS, PAYMENT PROCESSING METHOD, AND COMPUTER PROGRAM PRODUCT

(75) Inventors: Ichiro Hatano, Tokyo (JP); Tooru Tanabe, Tokyo (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 12/111,986

(22) Filed: Apr. 30, 2008

(65) Prior Publication Data

US 2008/0208708 A1 Aug. 28, 2008

Related U.S. Application Data

(62) Division of application No. 10/612,408, filed on Jul. 3, 2003.

(30) Foreign Application Priority Data

Jul. 4, 2002 (JP) ............................. 2002-196068

(51) Int. Cl.
*G06Q 40/00* (2006.01)
(52) U.S. Cl. ..................................... 705/40
(58) Field of Classification Search .................. 705/26, 705/35, 39–42, 44, 53, 64–68, 74–79; 725/1–5; 707/100–104
See application file for complete search history.

(56) References Cited

U.S. PATENT DOCUMENTS

2002/0035479 A1* 3/2002 Takae et al. .................... 705/1

FOREIGN PATENT DOCUMENTS

| JP | 2000-259708 A | 9/2000 |
|---|---|---|
| JP | 2001-216350 A | 8/2001 |
| JP | 2001-256408 A | 9/2001 |
| JP | 2002-74212 A | 3/2002 |
| JP | 2002-99845 A | 4/2002 |

OTHER PUBLICATIONS

Stevens, "Global Purchasing and the Rise and Rise of Countertrade", Purchase & Supply Management, pp. 28-31, Sep. 1995.*
European Search Report dated Jul. 14, 2008 issued in EP Application No. 03 01 5225.
Statement in accordance with the Notice from the European Patent Office Jan. 10, 2007 concerning business methods, XP002456252.

* cited by examiner

Primary Examiner—Mary Cheung
(74) Attorney, Agent, or Firm—Sughrue Mion, PLLC

(57) ABSTRACT

A payment system having a server apparatus (50) capable of transmitting and receiving information via a communication network (1), a first terminal apparatus (10) for a purchase application, a second terminal apparatus (20) for an installment payment organization and a third terminal apparatus (30) for a settlement service organization. The first terminal apparatus includes an inputting device (104) for prompting to input desirable one of a plurality of payment plan informations each indicating a combination of (i) a part of an installment payment for a purchase price of a product, and (ii) a part of a settlement service for a price of a service, as well as for prompting to input personal information and the credit card number. The server apparatus includes a processing device (502) for extracting (i) information relating to items for an installment payment application and (ii) information relating to items for a settlement service application, separately from among the information inputted via the inputting device.

3 Claims, 7 Drawing Sheets

| PLAN | 1ST INSTALLMENT | MONTHLY | BONUS MONTH | AFTER 4TH YEAR |
|---|---|---|---|---|
| A | 0 | 4,000 | 13,000 | 2,000 |
| B | 50,000 | 3,000 | 10,000 | 2,000 |
| C | 90,000 | 2,000 | 8,000 | 2,000 |
| D | 150,000 | 2,000 | ... | 2,000 |

UNIT : YEN

PURCHASE APPLICATION FORM

401

- NAME:
- ADDRESS:
- POSTAL CODE:
- TELEPHONE NUMBER:
- E-MAIL ADDRESS:
- OCCUPATION:

..............

402

- PRODUCT NAME:
- REFERENCE NUMBER:

..............

404

- SETTLEMENT BANK:
- ACCOUNT NUMBER:
- ACCOUNT NAME:

..............

405

- CREDIT CARD NUMBER:

~CONFIRMED PLAN~

- PLAN : PLAN A
- INITIAL PAYMENT : 0YEN
- MONTHLY PAYMENT
  - UNTIL 3RD YEAR : 4,000YEN
  - AFTER 4TH YEAR : 2,000YEN
- BONUS MONTH : 13,000YEN

FIG. 7

PAYMENT SYSTEM AND METHOD, SERVER APPARATUS, PAYMENT PROCESSING METHOD, AND COMPUTER PROGRAM PRODUCT

CROSS REFERENCE TO RELATED APPLICATIONS

This application claims priority from U.S. application Ser. No. 10/612,408 filed Jul. 3, 2003, which claims benefit of Japanese Patent Application No. 2002-196068, filed Jul. 4, 2002 in the Japanese Property Office, the entire disclosures of which are hereby incorporated by reference.

BACKGROUND OF THE INVENTION

1. Field of the Invention

The present invention relates to a payment system and method using a server apparatus and a communication network, as for various products or merchandises and their associated various services involving both (i) a purchase price or bill for the product such as a communication apparatus and (ii) a service fee for the associated service continually provided through the product such as a communication service. The present invention also relates to the server apparatus and a payment processing method therewith, as well as a computer program product to provide the payment system and/or the server apparatus.

2. Description of the Related Art

There has been provided a payment system constructed in such a manner that a purchaser in his/her house and other situation, or a service clerk at the store, can submit a purchase application via a communication network with a computer apparatus disposed at the store or the house or with a portable computer, when the purchaser buys a product or merchandise in installments (i.e., on a loan). More concretely, a purchase application form is electronically completed by inputting or entering the data such as name, address, age, settlement account, product name, product reference number, via a keyboard and the like to fill entries in the purchase application form displayed, for example, on a screen of the computer apparatus, and the data therein is transmitted via the communication network. In response to this, an installment payment organization such as a loan company may examine about the allowability of the installment payment (e.g. credit checks, financial status checks, annual income checks) and inform the result via mail or e-mail.

On the other hand, there has been provided a payment system constructed in such a manner that simultaneously otherwise before or after purchasing the product, the purchaser or others can submit a service contract application via the communication network for a service involved or associated within the product, such as an information service or a network connection service supplied through mobile phones, computer apparatuses accessible via a network, or on-vehicle communication navigation apparatuses, as the product. More concretely, the service contract application form is electronically completed by inputting or entering the data such as name, address, age, credit card number, the kind of service, via a keyboard and the like to fill entries in the service contract application form displayed, for example, on a screen of the computer apparatus and the data therein is transmitted via the communication network. In response to this, a settlement service organization such as a credit company may examine about the allowability of the settlement service (e.g. credit card identifications, balance checks, payment performance record checks) and inform the result via mail or e-mail.

With regard to techniques to perform such an installment payment on the communication network, for example, the Japanese Patent Application Laid Open No. 2002-117289 discloses a technique to propose an exemplary installment sale in a Net business. The Japanese Patent Application Laid Open No. 2002-056292 discloses a technique to secure the credibility of the information about the purchaser for a mobile phone company through the leasing or the installment sale of the mobile phone. Each of the Japanese Patent Application Laid Open No. 2001-256408 and the Japanese Patent Application Laid Open No. Hei 11-296580 discloses a technique to control the transaction between a server of a seller and a server of a credit company in a Net business.

According to the payment system set forth above, however, the data for the installment payment application to the installment payment organization must be entered via the keyboard of the personal computer, for example, disposed at the store or the house, while the data for the settlement service application to the settlement service organization must be entered independently of the data entry for the installment payment application. Particularly, the common data between both two kinds of data entry, such as name, age, address, and telephone number must be entered on each application form. Therefore, through a whole transaction, the workload for the data entry is increased or the operation for the data entry is complicated, simultaneously the amount of the data input or the amount of the data to be processed becomes relatively large, causing such a technical problem that the lengthy and inefficient data processing or data management are inevitable to be performed in the computer apparatus. Further, since the prices or fees for the product and the service are independent of each other, it is difficult to recognize promptly the total running cost, if the service is provided through the settlement service after the purchase of the product in installments. Therefore, it is not easy for the purchaser to decide the purchase of the product and the associated service, causing another problem, i.e. the discouragement to purchasing it.

SUMMARY OF THE INVENTION

The present invention has accomplished in view of these problems for example. It is therefore an object of the present invention to provide a payment system and method, which can perform a data process of paying and/or collecting the debt through a server apparatus and a communication network as for a product and a service involving both a purchase price of the product such as a communication apparatus and a service fee of the associated service, such as a communication service continually supplied through the product after the purchase thereof, and to provide the server apparatus and the payment processing system therewith, as well as a computer program product to realize the payment system and/or the server apparatus.

The above object of the present invention can be achieved by a payment system having a server apparatus capable of transmitting and receiving information via a communication network, a first terminal apparatus for a purchase application, a second terminal apparatus for an installment payment organization, and a third terminal apparatus for a settlement service organization. The first terminal apparatus is provided with an inputting device for prompting to input desirable one of a plurality of payment plan informations each indicating a combination of (i) a payment plan portion according to which the purchaser pays a price of a product, which the purchaser is to buy, in installments through the installment payment organization, and (ii) a payment plan portion according to which the purchaser settles a price of a service continually provided to the purchaser through the product by means of a credit card issued by the settlement service organization and owned by the purchaser, as well as for prompting to input a certain kind of personal information about the purchaser and a credit card information indicating at least a card number of the credit card. At least one of the server apparatus and the first terminal apparatus is provided with: a processing device for extracting (i) information relating to an item or items predetermined for an installment payment application including at least a part of the personal information and the payment plan information and (ii) information relating to an item or items predetermined for a settlement service application including at least a part of the personal information, the payment plan information and the credit card information, separately from among the information inputted via the inputting device; a communication device for transmitting the information relating to the item or items for the installment payment application extracted by the processing device to the second terminal apparatus via the communication network, transmitting the information relating to the item or items predetermined for the settlement service application extracted by the processing device to the third terminal apparatus via the communication network, receiving installment payment examination result information indicating an acceptance or refusal of an installment payment transmitted via the communication network from the second terminal apparatus in response to the transmitted information relating to the item or items for the installment payment application, and receiving settlement service examination result information indicating an acceptance or refusal of a settlement service transmitted via the communication network from the third terminal apparatus in response to the transmitted information relating to the item or items for the settlement service application; and a confirming device for confirming a payment plan indicated by the payment plan information inputted via the inputting device, on the basis of the installment payment examination result information and the settlement service examination result information received by the communication device.

The above object of the present invention can be also achieved by a payment method performed in a payment system having a server apparatus' capable of transmitting and receiving information via a communication network, a first terminal apparatus for a purchase application, a second terminal apparatus for an installment payment organization, and a third terminal apparatus for a settlement service organization. The method is provided with, in the first terminal apparatus, an inputting process of prompting to input desirable one of a plurality of payment plan informations each indicating a combination of (i) a payment plan portion according to which—the purchaser pays a price of a product, which the purchaser is to buy, in installments through the installment payment organization, and (ii) a payment plan portion according to which the purchaser settles a price of a service continually provided to the purchaser through the product by means of a credit card issued by the settlement service organization and owned by the purchaser, as well as of prompting to input a certain kind of personal information about the purchaser and a credit card information indicating at least a card number of the credit card. The method is further provided, in at least one of the server apparatus and the first terminal apparatus, with: an extracting process of extracting (i) information relating to an item or items X20 predetermined for an installment payment application including at least a part of the personal information and the payment plan information and (ii) information relating to an item or items predetermined for a settlement service application including at least a part of the personal information, the payment plan information and the credit card information, separately from among the information inputted by the inputting process; a communication process of transmitting the information relating to the item or items for the installment payment application extracted by the extracting process to the second terminal apparatus via the communication network, transmitting the information relating to the item or items for the settlement service application extracted by the extracting process to the third terminal apparatus via the communication network, receiving installment payment examination result information indicating an acceptance or refusal of an installment payment transmitted via the communication network from the second terminal apparatus in response to the transmitted information relating to the item or items for the installment payment application, and receiving settlement service examination result information indicating an acceptance or refusal of a settlement service transmitted via the communication network from the third terminal apparatus in response to the transmitted information relating to the item or items for the settlement service application; and a confirming process of confirming a payment plan indicated by the payment plan information inputted by the inputting process, on the basis of the installment payment examination result information and the settlement service examination result information received by the communication process are performed.

The above object of the present invention can be also achieved by the above described server apparatus of the present invention, which is capable of transmitting and receiving information via a communication network among the above described first terminal apparatus, the above described second terminal apparatus and the above described third terminal apparatus of the present invention.

The above object of the present invention can be also achieved by a payment processing method in the above described server apparatus of the present invention, which is capable of transmitting and receiving information via a communication network among the above described first terminal apparatus, the above described second terminal apparatus and the above described third terminal apparatus of the present invention. The payment processing method is provided with: an extracting process of extracting (i) information relating to an item or items predetermined for an installment payment application including at least a part of the personal information and the payment plan information and (ii) information relating to an item or items predetermined for a settlement service application including at least a part of the personal information, the payment plan information and the credit card information separately from among the information inputted by the inputting process; a communication process of transmitting the extracted information relating to the item or items for the installment payment application to the second terminal apparatus via the communication network, transmitting the extracted information relating to the item or items for the settlement service application device to the third terminal apparatus via the communication network, receiving installment payment examination result information indicating an acceptance or refusal of an installment payment transmitted via the communication network from the second terminal apparatus in response to the transmitted information relating to the item or items for the installment payment application, and receiving settlement service examination result information indicating an acceptance or refusal of a settlement service transmitted via the communication network from the third terminal apparatus in response to the transmitted information relating to the item or items for the settlement service application; and a confirming process of confirming a payment plan indicated by the payment plan information inputted via the inputting device, on the basis of the installment payment examination result information and the settlement service examination result information received by the communication device.

The above object of the present invention can be also achieved by a computer program product in a computer-readable medium for tangibly embodying a program of instructions executable by a computer to make the computer function as at least one of the above described server apparatus, the above described first terminal apparatus, the above described second terminal apparatus, and the above described third terminal apparatus of the present invention.

According to the computer program product of the present invention, at least one of the server apparatus, the first terminal apparatus, the second terminal apparatus and the third terminal apparatus of the present invention set forth above can be embodied relatively readily, by loading the computer program product from the recording medium for storing the computer program product, such as a ROM, CD-ROM, DVD-ROM, hard disk or the like, into the computer, or downloading the computer program product, which may be a carrier wave, into the computer via a communication device. More concretely, the computer program product may comprise computer readable codes to cause the computer (or may comprise computer readable instructions for causing the computer) to function as respective one of the inputting device, the payment plan candidates outputting device, the confirmed plan outputting device, the processing device, the communication device, the confirming device and so on, in the server apparatus, the first terminal apparatus, the second terminal apparatus and/or the third terminal apparatus.

The above object of the present invention can be also achieved by another computer program product in a computer-readable medium for tangibly embodying a program of instructions executable by a computer to make the computer function as the above described server apparatus of the present invention.

According to this another computer program product, the server apparatus can be embodied relatively readily, by loading or downloading the computer program product. The computer program product may comprise computer readable codes to cause the computer (or may comprise computer readable instructions for causing the computer) to function as respective one of the processing device, the communication device, the confirming device, the payment plan information supplying device and so on, in the server apparatus.

The nature, utility, and further features of this invention will be more clearly apparent from the following detailed description with reference to preferred embodiments of the invention when read in conjunction with the accompanying drawings briefly described below.

BRIEF DESCRIPTION OF THE DRAWINGS

FIG. 4 is a plan view showing one example of payment plan information including a plurality of payment plans, which is displayed on a display device as a device for outputting payment plan candidates according to the Example.

FIG. 5 is a plan view illustrating one example of a purchase application form, which is displayed on the display device according to the Example.

FIG. 7 is a plan view showing one example of a confirmed plan display, which is displayed on the display device as a confirmed plan outputting device according to the Example.

DETAILED DESCRIPTION OF THE INVENTION

The embodiments of the present invention will now be discussed, referring to drawings.

Figure 1:
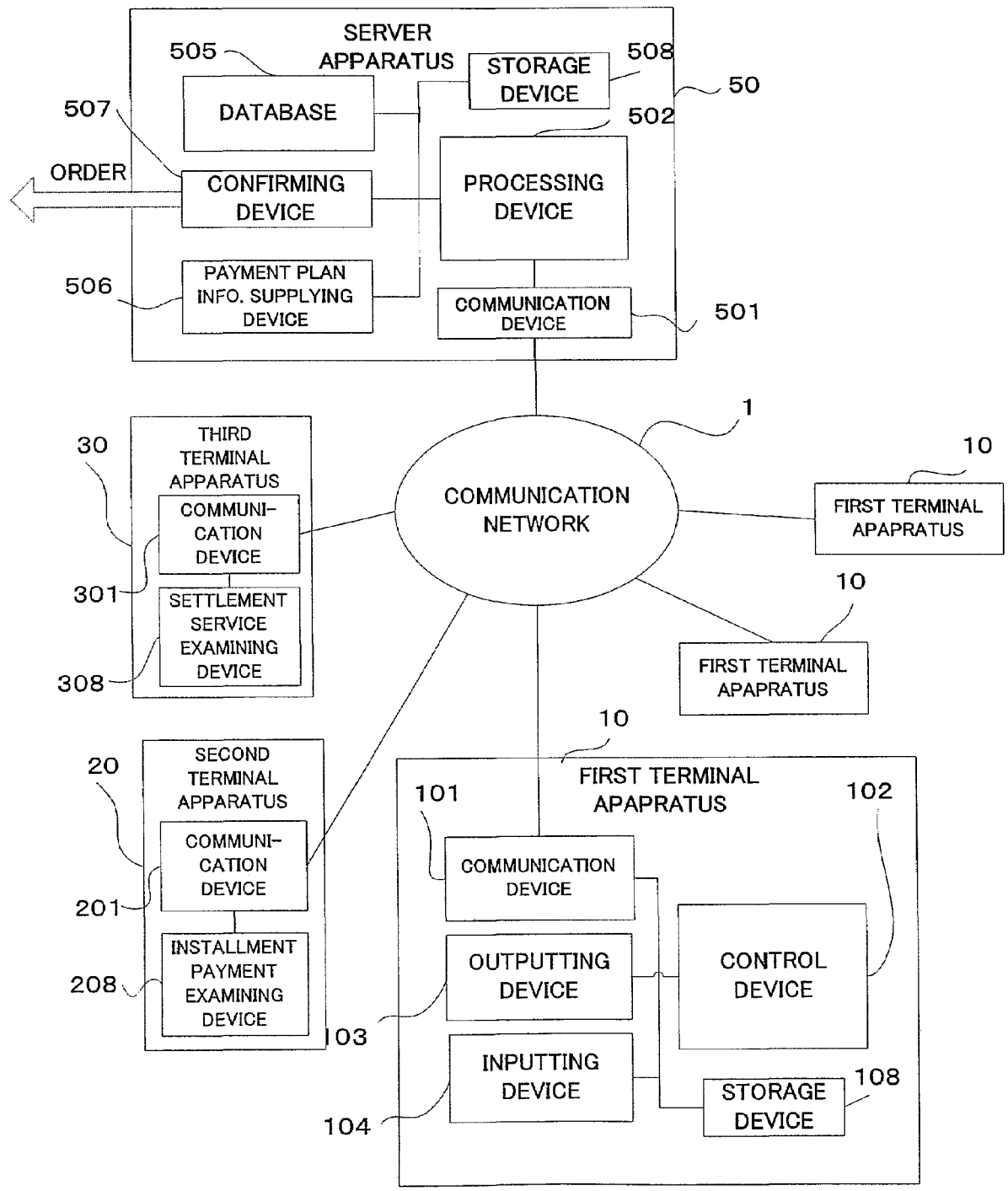
FIG. 1 is a block diagram illustrating a payment system according to an embodiment of the present invention.

The construction of an embodiment of the present invention will now be discussed, referring to FIG. 1. FIG. 1 is a block diagram illustrating a payment system according to the present embodiment.

As shown in FIG. 1, the payment system according to the present embodiment is provided with a server apparatus 50, a plurality of first terminal apparatuses 10, a second terminal apparatus 20 and a third terminal apparatus 30, each of which is for transferring contents information bidirectionaly via a communication network 1.

With regard to the first terminal apparatus 10 in the embodiment, as discussed below, an "inputting device" according to the present invention is exemplified in an inputting device 104, and a "confirmed plan outputting device" and a "payment plan candidates outputting device" according to the present invention are exemplified in an outputting device 103. With regard to the server apparatus 50, a "communication device" according to the present invention is exemplified in a communication device 501, a "processing device" according to the present invention is exemplified in a processing device 502, a "confirming device" according to the present invention is exemplified in a confirming device 507, and a "payment plan information supplying device" according to the present invention is exemplified in a payment plan information supplying device 506. With regard to the second terminal apparatus 20, an "installment examining device" according to the present invention is exemplified in an installment examining device 506. With regard to the third terminal apparatus 30, a "settlement examining device" according to the present invention is exemplified in a settlement examining device 308.

The communication network 1 may be a network including various communication lines such as private lines, public lines, telephone lines or the like regardless of wired or wireless.

The first terminal apparatus 10 is for the purchase application, and may be embodied in a personal computer, a mobile computer, a terminal apparatus and a cellular phone (mobile phone) capable of personal computer communication. The terminal apparatus 10 may be disposed at a car shop or other stores where the purchaser or a salesperson places an order, otherwise at the house of the purchaser. Alternatively, the purchaser may possess the terminal apparatus 10.

The terminal apparatus 10 includes: a communication device 101 such as a modem; an outputting device 103 such as a display device; a printer device or an audio outputting device; an inputting device 104 such as a keyboard, a mouse, a touch panel or an audio inputting device; and a storage device 108 such as an optical disk device, a semiconductor memory or a hard disk device. In addition to those devices, the terminal apparatus 10 further includes a control device 102, for example having a CPU or the like, to control those devices. The control device 102 is operative to control the operation of the first terminal apparatus 10 with a computer program, which may be pre-loaded into the storage device 108 otherwise may be loaded from a recording medium in the storage device 108 or may be downloaded via the communication device 101, as discussed later.

The second terminal apparatus 20 is for an installment payment application, and may be embodied in a large or medium sized computer, a work station, a personal computer or the like. The second terminal apparatus 20 may be disposed at an installment payment organization such as a loan company. The second terminal apparatus 20 includes: a communication device 201 such as a modem; and an installment payment examining device 208 having a CPU, a memory and the like.

The third terminal apparatus 30 is for a settlement service application, and may be embodied in a large or medium sized computer, a work station, a personal computer or the like. The third terminal apparatus 30 may be disposed at a settlement service organization such as a credit company. The navigation apparatuses, cellular phones, mobile communication apparatuses, AV (Audio-Visual) apparatuses or personal computers, and (ii) their associated services continually provided through the products, such as software provisions to provide the information, computer programs and so on. That is, the merchandise according to the present embodiment does not fully function by itself but fully functions as various services are supplied thereto by the telecom suppliers, the information suppliers, the contents or software vendors, or the providers. The "service continually supplied" according to the present invention means a service supplied for a certain period of time, such as for many weeks, for many months or for many years, regardless of continuously,' periodically, intermittently regularly or irregularly.

The server apparatus 50 includes: a communication device 501 such as a modem; a processing device 502 having a CPU, a memory or the like; a database such as a hard disk; a payment plan information supplying device 506 having a CPU, a memory or the like; a confirming device 507 having a CPU, a memory or the like; and a storage device 508 such as a RAM or ROM. The processing device 502, the payment plan information supplying device 506 and the confirming device 507 may be logically constructed in a single CPU or controller, or may be separately constructed in different CPUs or controllers.

Particularly in this embodiment, with regard to the first terminal apparatus 10, the outputting device 103 is operative to output visually, on a display screen and under control of the control device 102, payment plan information indicating a plurality of combinations of (i) a payment plan portion in installments through the installment payment organization for the price of the product to be purchased by the purchaser and (ii) a payment plan portion with a settlement service, through a credit card issued from the settlement service organization to the purchaser, for the service charge of the service continually supplied to the purchaser through the product. Additionally or alternatively, the outputting device 103 may be operative to output payment informations including a plurality of payment plans on a paper, or in a sound wave. The inputting device 104 is operative to prompt the purchaser to input or select the preferable payment plan among the plurality of payment plans, which are included in the payment plan information proposed and outputted from the outputting device 103 as the candidates, and prompt the purchaser to input the certain kind of personal information and the credit card number.

Preferably in this embodiment, the outputting device 103 is operative as "a payment plan outputting device" to output, in a certain format, the payment plan information supplied via the communication network 1 from the payment plan information supplying device 506 disposed in the server apparatus 50. This payment plan information may be updated according to the management strategy or marketing strategy of the seller possessing the server apparatus 50 and may be supplied from the payment plan information supplying device 506 to a plurality of first communication terminal apparatus 10 disposed, for example, over the whole country or the world. In this way, the purchaser can view and recognize the payment plan information including multiple payment plans very simply through the screen or the like, owing to the display of the selectable multiple payment plans by the outputting device 103 in a certain format, such as a list or table. More preferably, the outputting device 103 for outputting visually the payment plan information includes a display device, on the screen of which the preferable payment plan among the proposed payment plans included in the payment plan information can be selected. Thereby, the operation is further simplified.

Nevertheless, the outputting device 103 acting as the payment plan outputting device may include a printer device in addition to or instead of the display device. In this case, the purchaser and others can select or input the preferable payment plan, by viewing the payment plan information printed in a list or table on a paper. Moreover, this, outputting device 103 may include an audio outputting device in addition to or instead of the display device and the printer device. In this case, the purchaser and others can select the preferable payment plan, by listening to the payment plan information outputted audibly in the synthesized or recorded voice.

In any case, constructing the inputting device 104 to prompt the purchaser or others to select either one of the proposed payment plans included in the information outputted by the outputting device 103 facilitates the input operation for the preferable payment plan.

The inputting device 104 is also operative to prompt the purchaser or others (in this stage, a purchaser-to-be or an applicant, otherwise a service clerk) to input the personal information. For example, a form including (i) a personal section for the name, age, address, postal code, telephone number, email address, place of work, occupation and annual income of the purchaser, (ii) a credit card section for the credit card number, and (iii) a product section for the reference number or the name of the preferable product to be purchased may be displayed on the screen of the display device as one component of the outputting device 103 to prompt the purchaser or the service clerk to enter or input the data according to the form via the inputting device 104 such as a keyboard or the like.

On the other hand, with regard to the server apparatus 50, the communication device 501 is operative to receive the information including the payment plan information, the personal information and the credit card information, which were inputted via the inputting device 104 and transmitted from the communication device 101 via the communication network 1. The processing device 502 is operative to extract separately from each other (i) the information relating to entries predetermined for an installment payment application including at least a part of the personal information and the payment plan information, and (ii) the information relating to entries predetermined for a settlement service application including at least a part of the personal information, the payment plan information and the credit card information, from among the information received at the communication device 501.

In this embodiment, the server apparatus 50 is operative to register the information including the personal information, the payment plan information and the credit card information received at the communication device 501, into the database 505. Thus, the processing device 502 is operative to extract (i) the information relating to entries for the installment payment application and (ii) the information relating to entries for the settlement service application, separately from each other, from among the information registered or to be registered into the database 505.

The processing device 502 may be arranged to process the information relating to entries for the installment payment application into a format adapted for the second terminal apparatus 20 and the information relating to entries for the settlement service application into a format adapted for the third terminal apparatus 30, in addition to the extraction of the information registered or to be registered into the database 505. Into the database 505, the information may be registered before or after the above-mentioned processing. In any case, it is convenient that using data in a different kind of format among the first, second and third terminal apparatus 10, 20 and 30 respectively facilitates the use of different kind of OS (Operating System) or application program among them. On the other hand, using data in a common format or standard among these terminal apparatuses is also possible, avoiding the processing of the data entered at the first terminal apparatus 10 to adapt for the second or third terminal apparatus 20 or 30.

The communication device 501 in the server apparatus 50 is operative to transmit the information relating to entries for the installment payment application extracted or reformed in the processing device 502 to the second apparatus 20 via the communication network 1, under control of the processing device 502. Before or after this, otherwise simultaneously, the communication device 501 is also operative to transmit the information relating to entries for the settlement service application extracted or reformed in the processing device 502 to the third apparatus 30 via the communication network 1, under control of the processing device 502.

Particularly in this embodiment, the installment payment examining device 208 in the second terminal apparatus 20 is operative to examine the purchaser for the acceptance or refusal of the installment payment, based on the information relating to entries for the installment payment application received at the communication device 201 via the communication network 1. This examination may be made automatically from a certain entries (e.g. the annual income, the loan balance etc.) of the personal information included in the received information, in association with, the payment plan (e.g., the monthly installment) selected by the purchaser or other person. Alternatively, this examination is made automatically or semi-automatically otherwise with human decision, referring to other personal information about the purchaser or the credit inquiry information belonged to the installment payment organization such as a loan company where the second terminal apparatus 20 is disposed. The second terminal apparatus 20 is then operative to transmit the examination result outputted by, the installment payment examining device 208 to the server apparatus 50 via the communication network 1. Thus, according to the payment system of this. embodiment, the total examination for the installment payment can be made quickly on the communication network 1.

Particularly in this embodiment, with regard to the third terminal apparatus 30, the settlement service examining device 308 is operative to examine the purchaser for the acceptance or refusal of the settlement service, based on the information relating to entries for the settlement service application received at the communication device 301 via the communication network 1. This examination may be made automatically from a certain entries (e.g. the annual income, the credit balance etc.) of the personal information included in the received information, in association with a payment plan (e.g., the monthly payment) selected by the purchaser or other person. Alternatively, this examination is made automatically or semi automatically otherwise with human decision, referring to other personal information about the purchaser, particularly past payment or nonpayment record or the credit inquiry information belonged to the settlement service organization such as a credit company where the third terminal apparatus 30 is disposed. At this time, the identification check may be also made, which is typically made when the credit card is used. The third terminal apparatus 30 is then operative to transmit the examination result outputted by the settlement service examining device 308 to the server apparatus 50 via the communication network 1. Thus, according to the payment system of this embodiment, the total examination for the settlement service can be made quickly in the communication network 1.

With regard to the server apparatus 50, under control of the processing device 502, the communication device 501 is operative to receive the result information indicating the acceptance or refusal of the installment payment transmitted from the second terminal apparatus 20 via the communication network 1 in response to the information relating to entries for the installment payment application. The communication device 501 is also operative to receive the result information indicating the acceptance or refusal of the settlement service transmitted from the third terminal apparatus 30 via the communication network 1 in response to the information relating to entries for the settlement service application.

Moreover, the confirming device 507 in the server apparatus 50 is operative to confirm or firm up the payment plan indicated by the payment plan information, which has been already inputted by the purchaser or the service clerk, as the plan to be actually carried out, on the basis of the result information of the installment payment examination and the settlement payment examination, if the result is positive. Then, the confirming device 507 is operative to inform the fact that the plan is firmed up, to the first terminal apparatus 1 via the communication network 1. Before or after, otherwise simultaneously, the confirming device 507 is operative to place the shipping order (see an arrow in FIG. 1).

In this arrangement, as the confirming device 507 firms up the payment plan, the fact that the selected payment plan is accepted is quickly informed to the purchaser or the service clerk manipulating the first terminal apparatus at the home or the store. The secure and quick order of the merchandise can be carried out online or offline.

Nevertheless, after firming up the payment plan, the confirming device 507 may output visually or print out the fact of firming up in a certain format at the side of the server apparatus 50. Then, for example, the seller or the employee who checked the output may inform to the purchaser, who is in the house or the service clerk at the store, the examination result by phone or mail. With regard to the shipping order, it may be made by the seller or the employee who checked such an output, or who checked a voucher newly printed out for indicating the shipping order.

On the other hand, if the confirming device 507 fails to firm up the payment plan, on the basis of the installment payment examination result information and the settlement service examination result information, both or either of which is negative, the payment plan information supplying device 506 may propose one or more payment plans applicable to the purchaser, on the basis of the personal information of the purchaser. Alternatively, the payment plan information supplying device 506 may inform the first terminal apparatus 10 the fact that there is no payment plan applicable to the purchaser. As a result, the payment plan information supplying device 506 may transmit to the first terminal apparatus 10 the information for prohibiting the sale.

Thus, the payment plan information confirmed by the confirming device 507 or the fact of confirmation may be transmitted from the communication device 501 in the server apparatus 50 to the communication device 101 in the first terminal apparatus 10 via the communication network 1. With regard to the first terminal apparatus 10, the outputting device 103 is operative also as a confirmed plan outputting device arranged to output the payment plan information, which has been firmed up in the confirming device 507 and transmitted from the communication device 501, in a certain format. In this arrangement, the confirmed payment plan information can be viewed very easily and securely on the screen or the like of the outputting device 103 such as a display device or a printer device.

The payment method performed in the payment system constructed as mentioned above will now be discussed, referring to FIG. 1.

In FIG. 1, in the terminal apparatus 10, an inputting process of prompting to input the preferable payment plan among a plurality of payment plans included in the payment plan information and prompting to input the personal information as well as the credit card information including the card number is executed through the inputting device 104. On the other hand, in the server apparatus 50, an extracting process of separately extracting the information relating to entries for the installment payment application and the information relating to entries for the settlement service application from among the information inputted via the inputting device 104 is executed through the processing device 502. Moreover, in the server apparatus 50, a communication process of transmitting the extracted information relating to though the confirming device 507, on the basis of the received installment payment examination result information and the settlement service examination result information.

As described above, according to the present embodiment, the preferable payment plan can be inputted, for example, by selecting the preferable one through the inputting device 104 among the plurality of payment plans included in the payment plan information outputted through the outputting device 103 in the first terminal apparatus 10 disposed at the store or house. From the standpoint of the purchaser, he (or she) can submit both together the installment payment application and the settlement service application, for example, by inputting or entering the data using a single form. Relating to this, common information for both applications can be entered in a single inputting process. That is, the input operation for both applications can be facilitated and expedited, while the amount of data, the required throughput, the data flow or the like can be reduced. Additionally, among the information for which the data is entered collectively, the information required for the installment payment examination is extracted or reformed in the server apparatus 50 and transmitted to the second apparatus 20, while the information required for the settlement service examination is extracted or reformed in the server apparatus 50 and transmitted to the third terminal apparatus 30. Moreover, the server apparatus 50 can acquire the examination result indicating whether or not the selected payment plan included in the payment plan information is applicable to the purchaser in view of the installment payment and the settlement service quickly and securely via the communication network 1. Thereby, the selected payment plan can be firmed up or an alternative payment plan can be proposed, otherwise the sale can be prohibited.

Preferably in this embodiment, the price or amount of money to be paid during the period of the installment payment wherein the payment is made in installments is for both the price of the product and the associated service. The price to be paid after the period of the installment payment is only for the associated service.

In this arrangement, as for the sense of economy of the purchaser, it is possible to make the purchaser feel the reduction in the price through the payment in installments for the price of the product itself and the associated service, for example, as the monthly running cost. Moreover, after the period of installment payment, the purchaser may feel a glow of satisfaction in an economical viewpoint, since the running cost is reduced, In practice, since the purchase price of the product imposes the debt on the purchaser at the time of purchase, the seller managing the server apparatus 50 can gain substantial economical benefit in that the cash flow is remarkably improved due to the sale of product. Furthermore, the price for the optional service can be added to the original service price so that it is incorporated in the payment plan for the settlement service.

Therefore, in this embodiment, the outputting device 103 as the payment plan candidates outputting device preferably outputs the payment plan information including a plurality of payment plans in a format indistinctive between the product price and the service price, as the predetermined format, Thereby, the purchaser can select the payment plan, taking account of the running cost for both together the product and the associated service, without special attention to the distinction between the purchase price of the product and the price of the associated service.

In this embodiment, the inputting device 104 is preferably arranged in such a manner that the payment plan information, the personal information and the credit card information, covering the information for specifying the product and the service, as well as the information for the installment payment examination and the information for the settlement examination can be entered in a single application form, avoiding the overlap entry among each information.

In this arrangement, it is very convenient for the purchaser that the application for both the installment payment and the settlement service can be accomplished through the input or entry operation with respect to only a single application form. Moreover, avoiding the overlap entry among each information allows the amount of the data inputted to be reduced, and thereby the data throughput, the data flow, the data management load or the like to be reduced efficiently.

Nevertheless, the inputting device 104 may be arranged in such a manner that the payment plan information, the personal information and the credit card information are entered with respect to two forms each for the installment payment application and the settlement service application. In this case, if the one form is filled, the other form can be outputted with the overlap entries already filled before its data entry. In any case, such an arrangement that the entries overlapping between two application forms is avoided by the data entry with respect to either one form is sufficient to obtain the effect that the input operation can be facilitated and the data throughput or the data management load can be reduced in certain degrees.

Various Embodiments

In this embodiment, the payment plan information supplying device 506 may be arranged to propose one or more payment plans applicable to the purchaser, according to the predetermined basis using the personal information inputted via the inputting device 104.

In this arrangement, the purchaser or others can select the preferable plan without the waste operation, and thereby submit further quickly and simply the application.

Moreover, the payment plan information supplying device 506 may be arranged to propose a new payment plan, if there is no payment plan applicable to the purchaser among the payment plan information already supplied by default, according to the predetermined basis using the personal information inputted via the inputting device 104.

In this arrangement, if there is any payment plan applicable to the purchaser, according to the predetermined basis, using the personal information about the purchaser-to-be who submits the application under the presence of the payment plan information proposed provisionally by default, the application can be further proceed. On the contrary, if there is no payment plan applicable to the purchaser-to-be, newly proposing another payment plan assists the purchaser-to-be to be the purchaser.

Generally, under a situation in that the result of examination is negative, the increase in the amount of money to be paid in cash at the purchase application or the amount of the first installments facilitates passing through the examination. Therefore, for example, if the result of either one of the examination is negative at the installment payment examining device 208 or the settlement service examining device 308, a payment plan to pay the price of the product itself and the service for first three years at the first payment in a lump and later pay a fixed amount of money continually as the service change for the service after fourth year may be proposed.

Therefore, a plurality of payment plans proposed (e.g. by default in advance) from the payment plan information supplying device 506 preferably includes a payment plan to pay a certain part of the total price, such as the fixed or variable amount otherwise the amount of the purchaser's selection, in a lump as the first installment.

In this arrangement, in a situation that the purchaser prefers to pay more money as the first installment, or the result of the examination is expected to be rather negative, the efficient treatment can be performed from the beginning.

Moreover, the inputting device 104 is arranged to enter or input the purchaser's preference about the payment plan information in a predetermined format. Therefore, the payment plan information supplying device 506 may be arranged to propose one or more payment plans according to the purchaser's preference entered via the inputting device 104, such as the total price, the initial payment, the monthly payment, the existence/absence of the optional service etc.

In this arrangement, the payment plan information in line with the purchaser's preference or choice indicated by the preference information is transmitted to the first terminal apparatus 10, and thereby the purchaser can select the preferable payment plan comfortably, resulting in the further quick and secure application.

Still further, the payment plan information supplying device 506 may be arranged to propose the payment plan information with ranking reflecting at least one of (i) the adoption performance record in past of each payment plan, such as the number of applications, the number of purchases, the number of inquiries or the like and (ii) the research result about each payment plan, such as the popularity or the ranking information obtained by the survey at the store or online. Thereby, the outputting device 103 may be arranged to propose a plurality of payment plans in the order of the ranking, or to visually output a certain payment plan with a notation "the most popular now!".

In this arrangement, through the first terminal apparatus 10, the purchaser can select the payment plan peacefully, taking account of the difference in the popularity among the payment plans, resulting in the further quick and secure the application.

In this embodiment, the installment payment organization where the second terminal apparatus 20 is disposed may serve also as the settlement service organization where the third terminal apparatus 30 is disposed, and further the second terminal apparatus 20 may serve also as the third terminal apparatus 30. For example, the installment payment organization and the settlement payment organization may be in a same company, while the second terminal apparatus 20 and the third terminal apparatus 30 may be constructed in a single common computer or different multiple computers in the same company. In this way, a unified department in the same company can perform both the installment payment and the settlement service, and the common computer or the computers connected to each other with an intranet can construct the installment payment organization and the settlement service organization. Additionally, holding the data such as the personal information commonly between the installment payment organization and the settlement service organization is facilitated.

Thus, unifying two organizations allows transmitting or informing the installment payment schedule table or the invoice for the settlement service together to the purchaser, as well as the central management for various payments.

According to the embodiment set forth above, the processing device 502 for extracting and forming the information required for the installment payment examination or the settlement service examination as well as the communication device 501 for transmitting the information required for the installment payment examination to the second terminal apparatus 20 or transmitting the information required for the settlement service examination to the third terminal apparatus 30 are disposed in the server apparatus 50. However, at least a part of the information extracting function or the information transmitting function in the processing device 502 and the communication device 501 may be performed at the control device 102 and the communication device 101 in the first terminal apparatus 10.

The payment system according to the embodiment described referring to FIG. 1 is novel not only as a whole, but also in the server apparatus 50 itself or the first terminal apparatus 10 itself. Further, as shown in FIG. 1, connecting a number of the same first terminal apparatuses 10 to the server apparatus 50 contributes the increase in the profit from the payment system according to the present embodiment.

Additionally, the payment system according to the embodiment set forth above can be embodied relatively readily by running a computer program for serving a computer as a server apparatus 50 according to the invention. Concretely, a computer may be served as the server apparatus 50, by running the computer program for serving the computer as the server apparatus 50, after loading the program into the computer from a recording medium such as CD, DVD or the like, or downloading the program into the computer via the communication network 1. More concretely, the computer may be served as various devices set forth above such as the communication device 501, the processing device 502, the database 505, the payment plan information supplying device 506, the confirming device 507 and the storage device 508. Another computer may be served as the first terminal apparatus 10 by running the program, after loading the program into the computer from a recording medium such as CD, DVD or the like, or downloading the program into the computer via the communication network 1. More concretely, the computer may be served as various devices set forth above such as the communication device 101, the processing device 102, the outputting device 103, the inputting device 104 and the storage device 108. For example, most or part of the computer program to be used may be supplied from the server apparatus 50 to the first terminal apparatus 10 provided with a browsing function.

According to the embodiment of the present invention, as discussed above, the first terminal apparatus 10 is provided with the inputting device 104, and at least one of the server apparatus 50 and the first terminal apparatus 10 (in the embodiment, the server apparatus 50) is provided with the processing device 502, the communication device 501 and the confirming device 507. Alternatively, the inputting process is executed in the first terminal apparatus 10, and the extracting or reforming process, the communication process and the confirming process are executed in at least one of the server apparatus 50 and the first terminal apparatus 10 (in the embodiment, the server apparatus 50). Therefore, the data processing for the payment or collection of the fee or charge can be performed efficiently as for the product with the service involving the purchase price for each product and the price for each service continually served through the product after the purchase.

The nature, utility, and further features of this embodiment will be more clearly apparent from the following Examples.

EXAMPLES

Figure 2:
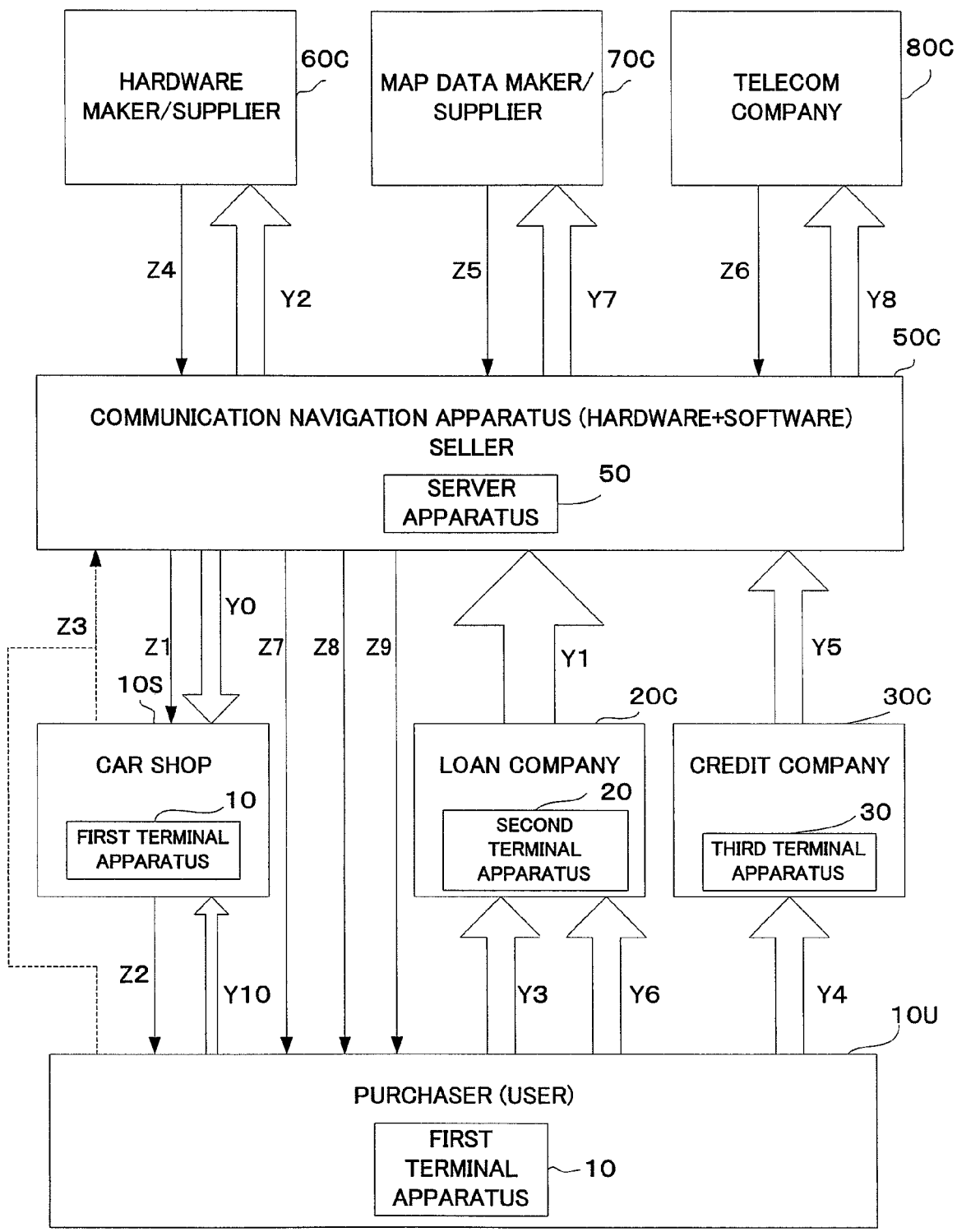
FIG. 2 is a block diagram conceptually illustrating a route of the product 20 etc., and a fee or charge collection route in the payment system according to the Example.
Figure 3:
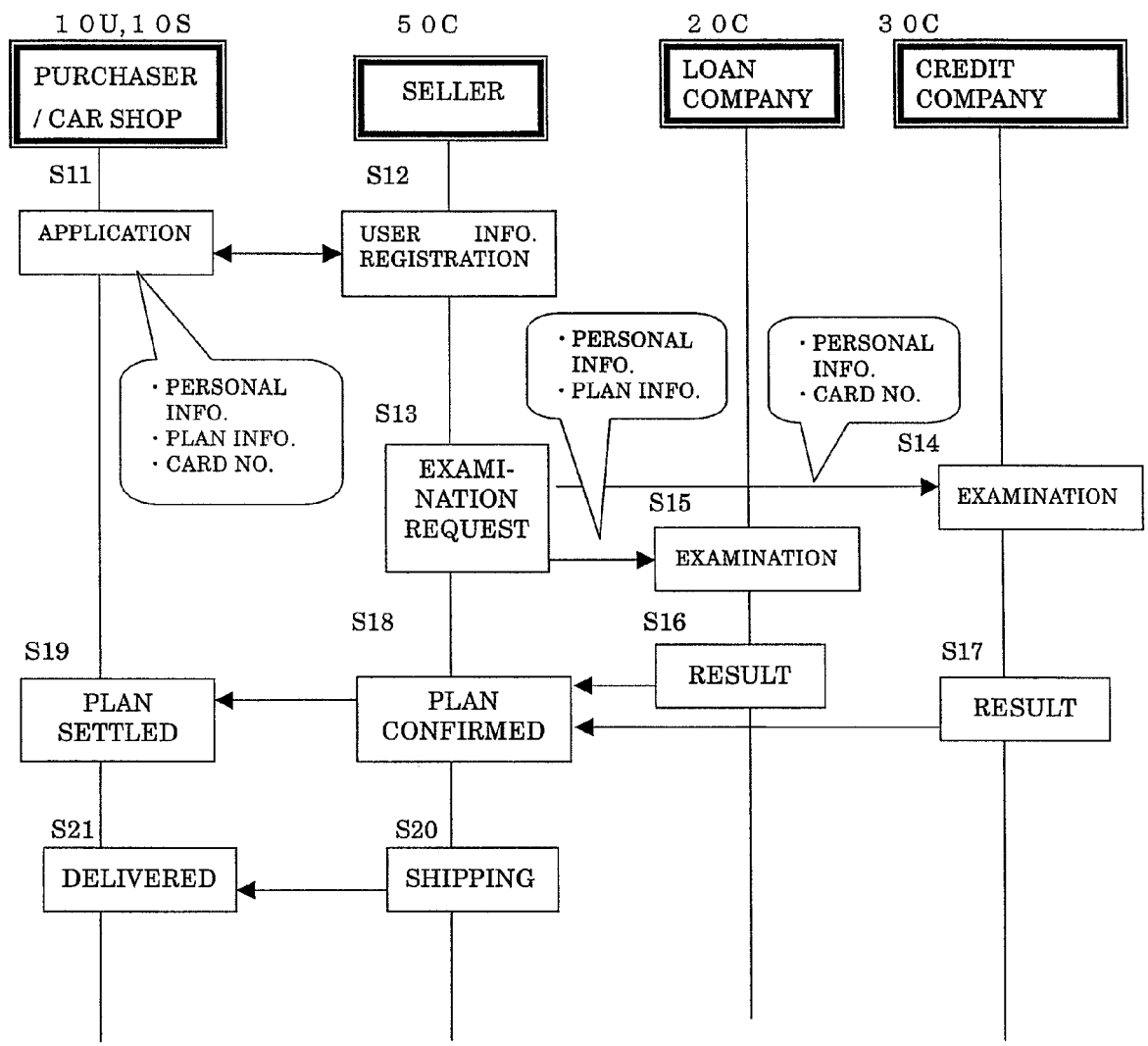
FIG. 3 is a sequence chart illustrating the data transaction among the purchaser, the seller, the loan company and the credit company according to the Example.
Figure 6:
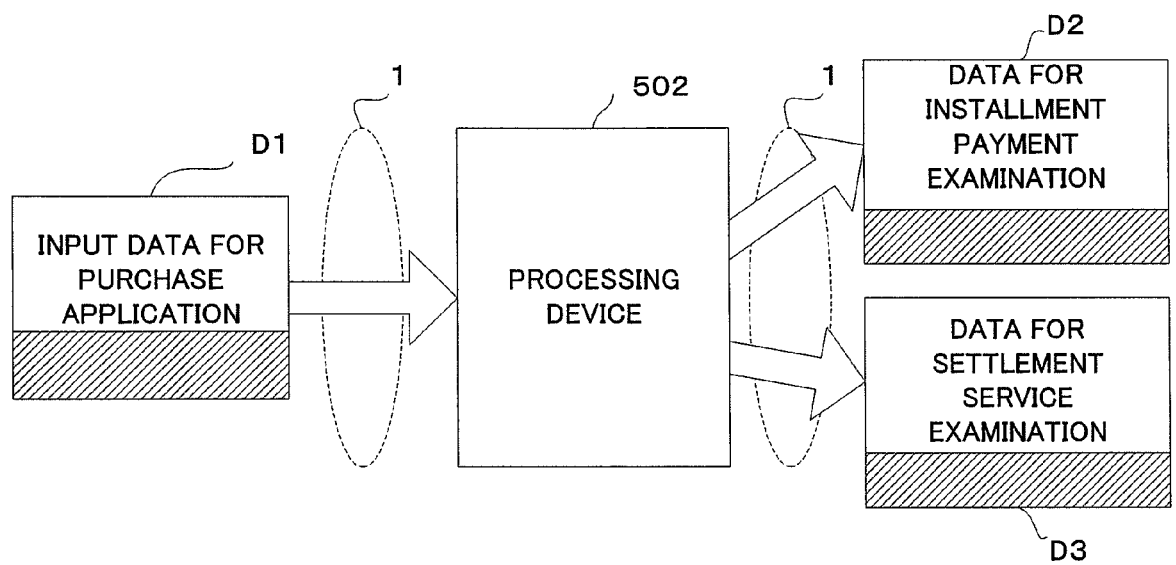
FIG. 6 is a conceptual view illustrating the data flow entered through the purchase application form and the change in the data structure according to the Example.

Examples of the present invention will be now discussed, referring to FIG. 2 to FIG. 7. FIG. 2 is a block diagram conceptually showing the product flow and the charge collection route in the payment system according to the present Example, wherein the flows of the product, the service and the data are shown with thinner arrows, while the flows of money are shown with thicker hollow arrows. FIG. 3 is a sequence chart according to the Example, showing the data transaction among the purchaser or car shop, the seller, the loan company and the credit company. FIG. 4 is a plan view showing exemplary payment plan information including a plurality of payment plans displayed on the display device as the payment plan candidates outputting device according to the Example. FIG. 5 is a plan view showing an exemplary purchase application form displayed on the display device. FIG. 6 is a conceptual view showing the flow of the data entered through the purchase application form and the change of the data. FIG. 7 is a plan view showing an exemplary confirmed plan display displayed on the display device as the confirmed plan outputting device.

The conceptual structure of the Example will now be discussed, referring to FIG. 2.

In the Example, the combination of (i) the communication navigation apparatus as one example of the product, and (ii) the delivery service of the map data capable of being displayed with the communication navigation apparatus and the provision service of the communication line indispensable for the operation of the communication navigation apparatus, as one example of the service accompanying the product, are exhibited and dealt at the car shop 10S. Then, the combination of the communication navigation apparatus as a hardware and the delivery of the map data as a software and the provision of the communication line is sold from the seller 50C directly to the purchaser, or via the car shop 10S.

In this situation, the price for the product and its associated service is paid, by using the payment system according to the Example, as discussed 10 below.

Referring to FIG. 2, one first terminal apparatus 10 is disposed at the house and the like of the purchaser 10U, and other first terminal apparatus 10 is disposed at the car shop 10S (e.g. at the store front). The second terminal apparatus 20 is disposed at the—loan company 20C as one example of the installment payment organization. The third terminal apparatus 30 is disposed at the credit card company 30C as one example of the settlement service organization. The server apparatus 50 is disposed at the seller 50C as one example of the seller, who sells the hardware of the communication navigation apparatus combined with the associated software. Further, the payment system involves the hardware maker/supplier 60C, the map data maker/supplier 70C and the telecom company 80C.

Next, the flow of the product, the service and the data as well as the cash flow feasible according to the payment system of the Example under the situation mentioned above will now be discussed sequentially, referring to FIG. 2.

First, as shown by an arrow Z1, the exhibition and the dealing of the product and the associated service are requested from the seller 50C to the car shop 10S. Before or after this, otherwise simultaneously, the brokerage fee for exhibiting and dealing merchandise is paid from the seller 50C to the car shop 10S, in a fixed fee or a commission.

In response to this, as shown by an arrow Z2, the car shop 10S exhibits and deals the product and the associated service for the purchaser 10U.

If the purchaser 10U decides the purchase at the house, or the dealing at the car shop 10S is clinched, a purchase application with the preferable plan is submitted through the first terminal apparatus 10, as shown by an arrow Z3. Concretely, as the embodiment discussed referring to FIG. 1, data is transmitted from the first terminal apparatus 10 to the server apparatus 50.

In response to this, after the payment plan is firmed up through the examination by the loan company 20C and the credit company 30C, the communication navigation apparatus as the product is shipped from the hardware maker/supplier 60C to the seller 50C, as shown by an arrow Z4. Along with this, as shown by an arrow Z5, the delivery right of the map data as the service is provided from the map data maker/supplier 70C to the seller 50C, and as shown by an arrow Z6, the license to use the communication line as the service is provided from the telecom company 80C to the seller 50C.

Next, as shown by an arrow Z7, the communication navigation apparatus is delivered from the seller 50C to the purchaser 10U, and, as shown by an arrow Z8, the map data is delivered from the seller 50C to the purchaser 10U, and as shown by an arrow Z9, the communication line is provided from the seller 50C to the purchaser 10U. The delivery of the map data and the provision of the communication line are served continually thereafter, for example, for several months or several years.

In response to the purchase in installments for the communication navigation apparatus, as shown by an arrow Y1, the total amount of price for the hardware part of the communication navigation apparatus is paid in a lump from the loan company 20C to the seller 50C. Before or after this, as shown by an arrow Y2, the code price for the hardware part of the communication navigation apparatus is paid from the seller 50C to the hardware maker/supplier 60C.

Then, as shown by an arrow Y3, the first installment for the purchase price of the hardware part of the communication navigation apparatus is paid from the purchaser 10U to the loan company 20C. Approximately at the same time, otherwise before or after this, as shown by an arrow Y4, the price for the service made of the delivery of the map data and the provision of the communication line is paid periodically, for example, monthly, from the purchaser 10U to the credit company 30C. This payment is endless insofar as such service is continued to be supplied.

The amount obtained from subtracting the dealing charge from the price paid to the credit company 30C is then paid from the credit company 30C to the seller 50C, as shown by an arrow Y5.

Then, as shown by an arrow Y6, the second and later installments for the price of the hardware part of the communication navigation apparatus is paid from the purchaser 10U to the loan company 20C, periodically through a certain period, e.g. through three years, with the predetermined frequency. Relating to this, an additional amount of money may be paid in the bonus season. In response to this, the price for the delivery of the map data is paid from the seller 50 C to the map data maker/supplier 70C, as shown by an arrow Y7, and the price for the provision of the communication line is paid from the seller 50C to the telecom company 80C, as shown by an arrow Y8.

As shown by an arrow Z2, from the car shop 10S to the purchaser 10U, the installation service of the communication navigation apparatus may be offered in addition to the exhibition or dealing thereof. In this case, as shown by an arrow Y10, the price for the installation service is paid directly from the purchaser 10U to the car shop 10S.

Next, the data transaction or transmission via the communication network to embody the payment system will now be discussed, referring to the sequence chart in FIG. 3. The sequence chart in FIG. 3 illustrates the actions of the purchaser 10U or the car shop 10S, the seller 50C, the loan company 20C and the credit company 30C as well as the inter-action thereamong in chronological order. Each transverse line indicates the inter-action, and the vertical lines indicate the time elapse.

First, referring to FIG. 3, the purchaser 10U or the car shop 10S can use the first terminal apparatus to select the preferable plan via the inputting device 104, among the plurality of payment plans indicated on the outputting device 103 as shown in FIG. 4. Alternatively, the service clerk or the purchaser can input the preferable payment plan, referring to the handbill or poster as shown in FIG. 4.

Further, for example, as shown in FIG. 5, a purchase application form is displayed on the screen of the outputting device 103, and personal information such as a name, an address, a postal code, a telephone number, an e-mail address or an occupation is entered in a personal information section 401 of the form via the inputting device 104, the product information such as a product name or a reference number is entered in a product information section 402 via the inputting device 104, the personal information such as a name of settlement bank, the account number or the name of the account is entered in an installment payment information section 404 via the inputting device 104, the credit card information such as a credit card number is entered in the credit card information section 405 via the inputting device 104 (step S11).

Referring again to FIG. 3, various kind of information entered as such is transmitted via the communication network 1 to the server apparatus 50 disposed at the seller 50C to be registered into the database 505 on a purchaser-by-purchaser basis. That is, at this stage, the purchaser registration is performed provisionally (step S12).

Further, among the information registered in the database 505, the information for the settlement service examination is extracted or reformed, and the information for the installment payment examination is extracted or reformed.

Next, the examination is requested to the credit company 30C and the loan company 20C (step S13). Concretely, the information for the settlement service examination including at least the credit card number and the part of the personal information is transmitted with the information indicating the examination request from the server apparatus 50 to the third terminal apparatus 30 disposed at the credit company 30C. Before or after this, otherwise simultaneously, the information for the installment payment examination including at least the payment plan and the part of the personal information is transmitted with the information indicating the examination request from the server apparatus 50 to the second terminal apparatus 20 disposed at the credit company 20C.

Particularly in the Example, as shown in FIG. 6, the input data D1 for the purchase application entered via the inputting device 104 at the first terminal apparatus in the step S11 is divided into the information data D2 for the installment payment examination and the information data D3 for the settlement service examination through the extraction or the reformation in the processing device 502 at the server apparatus 50. A part of the information data D2 for the installment payment examination and a part of the information data D3 for the settlement service examination are common in at least a part of the personal information, as conceptually shown with hatching in FIG. 6. Therefore, the amount of the data input, the data transmission, the data registration or the like within the period until the division in the processing device 502 can be remarkably reduced, in comparison with the case of the independently application each for the installment payment and the settlement service. Particularly, in spite of the high performance computer providing the first terminal apparatus 10, the data entry for the input data D1 for the purchase application in the step S11 typically requires a great effort especially for the purchaser not accustomed to the computer. Therefore, in a practical view point, it is very advantageous that the data entry for the overlap portion between the installment payment application information and the settlement service application information can be omitted, and the information data D2 for the installment payment application and the information data D3 for the settlement service application are extracted or reformed automatically at the server apparatus 50, as the Example. It is noted that the processing device 502 shown in FIG. 6 may perform the format conversion, as discussed above.

Referring again to FIG. 3, in response to the examination request in the step 813, inside of the third terminal apparatus 30 disposed at the credit company 30C, the examination to decide the acceptance or refusal of the settlement service is executed by the settlement service examining device 308, on the basis of the information transmitted from the server apparatus 50 (step S14). Before or after this, otherwise simultaneously, inside of the second terminal apparatus 20 disposed at the loan company 20C, the examination to decide the acceptance or refusal of the installment payment is executed by the installment payment examining device 208, on the basis of the information transmitted from the server apparatus 50 (step S15).

Then, the examination result indicating the acceptance or refusal of the installment payment is transmitted from the second terminal apparatus 20 disposed at the loan company 20C to the server apparatus 50 disposed at the seller 50C (step S16). Before or after this, otherwise simultaneously, the examination result indicating the acceptance or refusal of the settlement service is transmitted from the third terminal apparatus 30 disposed at the credit company 30C to the server apparatus 50 disposed at the seller 50C (step 517).

At the server apparatus 50 disposed at the seller 50C, the confirming device 507 firms up the payment plan, based on these examination results (step S18).

Depending on the product attribute or the purchaser's circumstances, it may take a relatively long time, e.g. for a few days or a few weeks, to complete the examination. Preferably in the Example, through the mentioned system configuration constructed on the communication network 1, a relatively short time period, e.g. for a few seconds or a few minutes, is sufficient to complete the procedure from the application to the firming up of the payment plan. However, the Example is applicable to the case involving the long time examination, providing the substantially effect.

Next, the server apparatus 50 disposed at the seller 50C transmits the fact that the payment plan is confirmed, to the purchaser 10U or the first terminal apparatus 10 disposed at the car shop 10S (step S19). For example, the confirmed plan as shown in FIG. 7 may be visually displayed or printed by the outputting device 103 in the first terminal apparatus 10. The purchaser can ensure the final order in detail, viewing the output or print. At this stage, the data for the final confirmation may be entered via the inputting device 104 and transmitted to the server apparatus 50.

If the payment plan can not be confirmed in the step S18, other payment plans may be proposed to the purchaser 10U or the first terminal apparatus 10 disposed at the car shop 10S, or a sales prohibition may be informed to the same, as mentioned above.

Inside of the server apparatus 50 disposed at the seller 50C, if the payment plan is confirmed in the step S18, the shipping order of the product is placed electronically, and then in response to the shipping order, the product is shipped actually, for example, by mail or via courier service (step S20). Thus, a series of data transaction is completed.

Later, the purchased product is delivered to the purchaser 10U or the car shop 10S (step S21). Thereafter, the price or balance payment to the loan company 20C and the credit card company 30C is conducted, as discussed referring to FIG. 2.

The payment system according to the present invention is applicable not only to the communication navigation apparatus, but also to any combination of any product and any service involving the payment with respect to the purchase price for the product and the price for the service, insofar as the service continuously provided through the product is exist.

As discussed above, according to the present embodiments, the first terminal apparatus 10 is provided with the inputting device 104, while the server apparatus 50 is provided with the processing device 502, the communication device 501 and the confirming device 507, and at the first terminal apparatus 10, the inputting process is executed, while at the server apparatus 50, the extracting process, the communication process and the confirming process are executed. Therefore, for example, with regard to the product and its associated service involving the purchase price for the product such as a communication apparatus and the price for the service continually provided through the product such as a communication service, the data processing for the payment or the collection of the debt can be carried out very efficiently.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2002-196068 filed on Jul. 4, 2002 including the specification, claims, drawings and summary is incorporated herein by reference in its entirety.

What is claimed is:

1. A server apparatus capable of transmitting and receiving information via a communication network among a first terminal apparatus with which a purchaser inputs desirable one of a plurality of payment plan informations in a purchase application, a second terminal apparatus in an installment payment organization, and a third terminal apparatus in a settlement service organization, the server apparatus comprising:

a processing device, wherein said processing device performs a step of extracting both (i) information relating to an item or items predetermined in an installment payment application including at least a part of a personal information and a payment plan information and (ii) information relating to an item or items predetermined in a settlement service application including at least a part of the personal information, the payment plan information and a credit card information separately from among the inputted informations in the first terminal apparatus; each inputted informations indicating a combination of both (iii-a) a payment plan portion according to which the purchaser pays a purchase price of a product, which the purchaser is to buy, in installments through the installment payment organization, and (iii-b) a payment plan portion according to which the purchaser settles a price of a service continually provided to the purchaser through the product by means of a credit card issued by the settlement service organization and owned by the purchaser, and indicating (iv) a certain kind of the personal information about the purchaser and the credit card information indicating at least a card number of the credit card;

a first transmitting device, wherein said first transmitting device performs a step of transmitting the extracted information relating to the item or items in the installment payment application to the second terminal apparatus via the communication network;

a second transmitting device, wherein said second transmitting device performs a step of transmitting the extracted information relating to the item or items in the settlement service application to the third terminal apparatus via the communication network;

a first receiving device, wherein said first receiving device performs a step of receiving installment payment examination result information indicating an acceptance or refusal of an installment payment transmitted via the communication network from the second terminal apparatus in response to the transmitted information relating to the item or items in the installment payment application;

second receiving device, wherein said second receiving device performs a step of receiving settlement service examination result information indicating an acceptance or refusal of a settlement service transmitted via the communication network from the third terminal apparatus in response to the transmitted information relating to the item or items in the settlement service application; and a confirming device, wherein said confirming device performs a step of confirming an acceptance or refusal of a payment plan indicated by the payment plan information input in the first terminal apparatus, on the basis of the installment payment examination result information received by said first receiving device, and the settlement service examination result information received by said second receiving device.

2. A payment processing method in a server apparatus capable of transmitting and receiving information via a communication network among a first terminal apparatus with which a purchaser inputs a desirable one of a plurality of payment plan informations in a purchase application, a second terminal apparatus in an installment payment organization, and a third terminal apparatus in a settlement service organization, the payment processing method comprising:

a step of extracting both (i) information relating to an item or items predetermined in an installment payment application including at least a part of a personal information and a payment plan information and (ii) information relating to an item or items predetermined in a settlement service application including at least a part of the personal information, the payment plan information and credit card information separately from among the inputted informations in the first terminal apparatus, each inputted informations indicating a combination of both (iii-a) a payment plan according to which the purchaser pays a purchase price of a product, which the purchaser is to buy, in installments through the installment payment organization, and (iii-b) a payment plan portion according to which the purchaser settles a price of a service continually provided to the purchaser through the product by means of a credit card issued by the settlement service organization and owned by the purchaser, and indicating (iv) a certain kind of personal information about the purchaser and the credit card information indicating at least a card number of the credit card, the inputting device being had by the first terminal apparatus for a purchase application;

a first transmitting step of transmitting the extracted information relating to the item or items in the installment payment application to the second terminal apparatus for an installment payment organization, via the communication network;

a second transmitting step of transmitting the extracted information relating to the item or items for the settlement service application to the third terminal apparatus in the settlement service organization, via the communication network;

a first receiving step of receiving installment payment examination result information indicating an acceptance or refusal of an installment payment transmitted via the communication network from the second terminal apparatus in response to the transmitted information relating to the item or items in the installment payment application;

a second receiving step of receiving settlement service examination result information indicating an acceptance or refusal of a settlement service transmitted via the communication network from the third terminal apparatus in response to the transmitted information relating to the item or items in the settlement service application; and a step of confirming an acceptance or refusal of a payment plan indicated by the payment plan information inputted in the first terminal apparatus, on the basis of the installment payment examination result information received in the first receiving step, and the settlement service examination result information received in the second receiving step.

3. A computer program product in a computer-readable medium for tangibly embodying a program of instructions executable by a computer to make the computer function as a server apparatus capable of transmitting and receiving information via a communication network among a first terminal apparatus with which a purchaser inputs a desirable one of a plurality of payment plan informations in a purchase application, a second terminal apparatus in an installment payment organization, and a third terminal apparatus in a settlement service organization, these components being provided for a payment system, wherein, the server apparatus comprises:

a processing device, wherein said processing device performs a step of extracting both (i) information relating to an item or items predetermined in an installment payment application including at least a part of a personal information and a payment plan information and (ii) information relating to an item or items predetermined in a settlement service application including at least a part of the personal information, the payment plan information and a credit card information separately from among the inputted informations in the first terminal apparatus, each inputted informations indicating a combination of both (iii-a) a payment plan portion according to which the purchaser pays a purchase price of a product, which the purchaser is to buy, in installments through the installment payment organization, and (iii-b) a payment plan portion according to which the purchaser settles a price of a service continually provided to the purchaser through the product by means of a credit card issued by the settlement service organization and owned by the purchaser, and indicating (iv) a certain kind of the personal information about the purchaser and the credit card information indicating at least a card number of the credit card;

a first transmitting device wherein said first transmitting device performs a step of transmitting the extracted information relating to the item or items in the installment payment application to the second terminal apparatus via the communication network;

a second transmitting device, wherein said second transmitting device performs a step of transmitting the extracted information relating to the item or items in the settlement service application to the third terminal apparatus via the communication network;

a first receiving device, wherein said first receiving device performs a step of receiving installment payment examination result information indicating an acceptance or refusal of an installment payment transmitted via the communication network from the second terminal apparatus in response to the transmitted information relating to the item or items in the installment payment application;

a second receiving device, wherein said second receiving device performs a step of receiving settlement service examination result information indicating an acceptance or refusal of a settlement service transmitted via the communication network from the third terminal apparatus in response to the transmitted information relating to the item or items in the settlement service application; and a confirming device, wherein said confirming device performs a step of confirming an acceptance or refusal of a payment plan indicated by the payment plan information inputted in the first terminal apparatus, on the basis of the installment payment examination result information received by said first receiving device, and the settlement service examination result information received by said second receiving device.

* * * * *